United States Patent
Yamaguchi (10) Patent No.: US 6,906,442 B2
(45) Date of Patent: Jun. 14, 2005

(54) MOTOR THAT UTILIZES THE MAGNETIC TORQUE

(75) Inventor: Yasuo Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 119 days.

(21) Appl. No.: 10/603,867

(22) Filed: Jun. 26, 2003

(65) Prior Publication Data

US 2005/0017588 A1 Jan. 27, 2005

(30) Foreign Application Priority Data

Jun. 27, 2002 (JP) .................................... 2002-188392

(51) Int. Cl.$^7$ ............................................. H02K 21/12
(52) U.S. Cl. .................................. 310/156.43; 310/216
(58) Field of Search ....................... 310/156.43–156.46, 310/156.56–156.59, 216, 261, 266–267

(56) References Cited

U.S. PATENT DOCUMENTS

| | | | | |
|---|---|---|---|---|
| 4,302,693 A | * | 11/1981 | Burgmeier et al. | .... 310/156.59 |
| 4,700,096 A | * | 10/1987 | Epars | .......................... 310/153 |
| 4,777,397 A | | 10/1988 | Parshall | |
| 5,010,266 A | * | 4/1991 | Uchida | ................... 310/156.22 |
| 5,038,065 A | * | 8/1991 | Matsubayashi et al. | ...... 310/162 |
| 5,631,512 A | | 5/1997 | Kawabata et al. | |

FOREIGN PATENT DOCUMENTS

| | | |
|---|---|---|
| EP | 0 676 853 A2 | 10/1995 |
| EP | 1 283 581 A2 | 2/2003 |

* cited by examiner

Primary Examiner—Thanh Lam
(74) Attorney, Agent, or Firm—Oliff & Berridge, PLC (57) ABSTRACT

A motor has a rotatably supported rotor core and permanent magnets disposed at equal intervals at a plurality of positions in a circumferential direction of the rotor core. The rotor core has projecting poles formed at equal intervals at a center between each permanent magnet. Furthermore, an opening angle center line of each projecting pole conforms to a center line of an angle created by each opening angle center line of two adjacent permanent magnets. Additionally, each projecting pole is shaped asymmetrical to a line connecting a center of the projecting pole in the rotational direction of the rotor core and an axis center of the rotor core.

13 Claims, 9 Drawing Sheets

RELATED ART

MOTOR THAT UTILIZES THE MAGNETIC TORQUE

INCORPORATION BY REFERENCE

The disclosure of Japanese Patent Application No. 2002-188392 filed on Jun. 27, 2002 including the specification, drawings and abstract are incorporated herein by reference in its entirety.

BACKGROUND OF THE INVENTION

1. Field of Invention

The invention relates to a motor.

2. Description of Related Art

Conventionally, in a motor utilizing magnet torque and reluctance torque together, for example in a permanent magnet synchronous motor, the permanent magnet for generating magnet torque is disposed on a d axis of a rotor, and a projecting pole for generating reluctance torque is disposed on a q axis. The magnet torque and reluctance torque are changed by changing a current phase indicating the position of an electromagnet formed by a current supplied to a stator coil.

Figure 2:
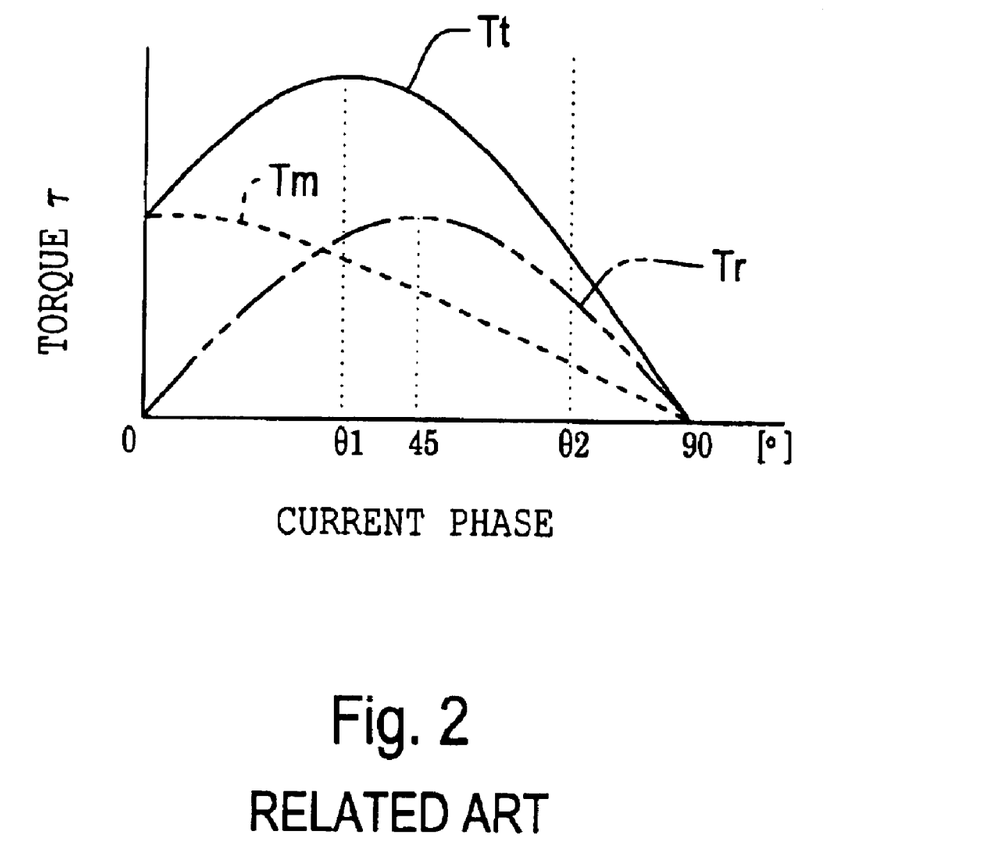
FIG. 2 is a relation drawing of a current phase and a torque.

FIG. 2 is a relation drawing of the current phase and torque. In this figure, the current phase is plotted on the horizontal axis, and torque on the vertical axis. In this figure, Tm indicates magnet torque, Tr indicates reluctance torque, and Tt indicates a total torque indicating a sum of the magnet torque Tm and the reluctance torque Tr. Assuming that the current phase has an electrical degree of 0° when the electromagnet is positioned at a center between each permanent magnet and at a center of the projecting pole, the magnet torque Tm becomes a maximum value when the current phase is 0°, and the reluctance torque Tr becomes a maximum value when the current phase is 45°. Therefore, the maximum value of the total torque Tt is obtained when the current phase is at a value θ1 (30° for example) between 0 and 45°, where the magnet torque Tm is not the maximum value.

However, the above conventional motor is such that the maximum value of the total torque Tt is obtained while the magnet torque Tm is not at the maximum value. For this reason, the magnet torque Tm cannot be sufficiently utilized. Therefore, generating the total torque Tt of a required value requires a larger permanent magnet. Consequently, the size of the motor is increased.

Meanwhile, a motor driven at a high speed increases a resistance which is indicated as a product of a motor angular speed ω and a q-axis inductance Lq. Therefore, in order to decrease inductance for the projecting pole, that is, a product of the q-axis inductance Lq and a q-axis current iq, the current phase (mentioned above) must be advanced toward 90°, for example, to a value θ2 (such as 70°). In this case, the quantity of magnetic flux passing through the projecting pole is decreased, thus a torque constant of the motor becomes smaller. Therefore, the magnet torque Tm and the reluctance torque Tr are reduced, thereby reducing the total torque Tt as well. As a result, the output generated by the motor becomes smaller.

SUMMARY OF THE INVENTION

The invention thus provides a motor which solves the above problems of the conventional motor, and is capable of sufficiently utilizing the magnet torque, thereby allowing downsizing of the motor, and at the same time, increasing the output generated by the motor when driven at high speed.

Thus, a motor according to a first exemplary aspect of the invention has a rotatably supported rotor core and permanent magnets disposed at equal intervals at a plurality of positions in a circumferential direction of the rotor core.

Furthermore, the rotor core has projecting poles formed at equal intervals at a center between each permanent magnet. In addition, the opening angle center line of each projecting pole conforms to a center line of an angle created by each opening angle center line of two adjacent permanent magnets. Additionally, each projecting pole is shaped asymmetrical to a line connecting a center of the projecting pole in a rotational direction of the rotor core and an axis center of the rotor core.

In this case, the center in the density distribution of magnetic flux which is generated in the projecting pole by magnetomotive force caused by running the q-axis current through the coil is shifted in a direction opposite the rotational direction of the rotor. Therefore, the magnet torque can be sufficiently utilized, and the motor can be downsized.

Furthermore, an amount by which the current phase is advanced when executing a magnetic field weakening control can be reduced by that amount. Thus, the total torque can be prevented from decreasing, thereby allowing the output generated by the motor to increase.

In addition, the motor torque during regenerating is decreased, thus the motor torque during regenerating and the motor torque during powering can be made equal. Therefore, the output of the motor during powering and regenerating can be equalized.

A motor according to a second exemplary aspect of the invention has a rotatably supported rotor core and permanent magnets disposed at equal intervals at a plurality of positions in a circumferential direction of the rotor core.

Furthermore, the rotor core has projecting poles formed at equal intervals at the center between each permanent magnet. In addition, the opening angle center line of each projecting pole conforms to the center line of the angle created by each opening angle center line of two adjacent permanent magnets. Additionally, an air gap on a side downstream from a center of the projecting pole in the rotational direction of the rotor core is larger than an air gap on an upstream side with respect to each projecting pole.

A motor according to a third exemplary aspect of the invention has a rotatably supported rotor core and permanent magnets disposed at equal intervals at a plurality of positions in a circumferential direction of the rotor core.

Furthermore, the rotor core has projecting poles formed at equal intervals at the center between each permanent magnet. In addition, the opening angle center line of each projecting pole conforms to the center line of the angle created by each opening angle center line of two adjacent permanent magnets. Additionally, a tapered portion is formed on the front half portion of each projecting pole.

In this case, when the rotor core is rotated, a change in the magnetic flux flow at the time where the respective teeth and corresponding projecting poles are switched can be reduced. Thus, pulsation can be prevented from occurring.

A motor according to a fourth exemplary aspect of the present invention has a rotatably supported rotor core and permanent magnets disposed at equal intervals at a plurality of positions in a circumferential direction of the rotor core.

Furthermore, the rotor core has projecting poles formed at equal intervals at the center between each permanent magnet. In addition, the opening angle center line of each projecting pole conforms to the center line of the angle created by each opening angle center line of two adjacent permanent magnets. Additionally, a hole portion is formed on the front half portion of each projecting pole.

BRIEF DESCRIPTION OF THE DRAWINGS

Various embodiments of the invention will be described with reference to the drawings; wherein.

DETAILED DESCRIPTION OF THE PREFERRED EMBODIMENTS

Figure 3:
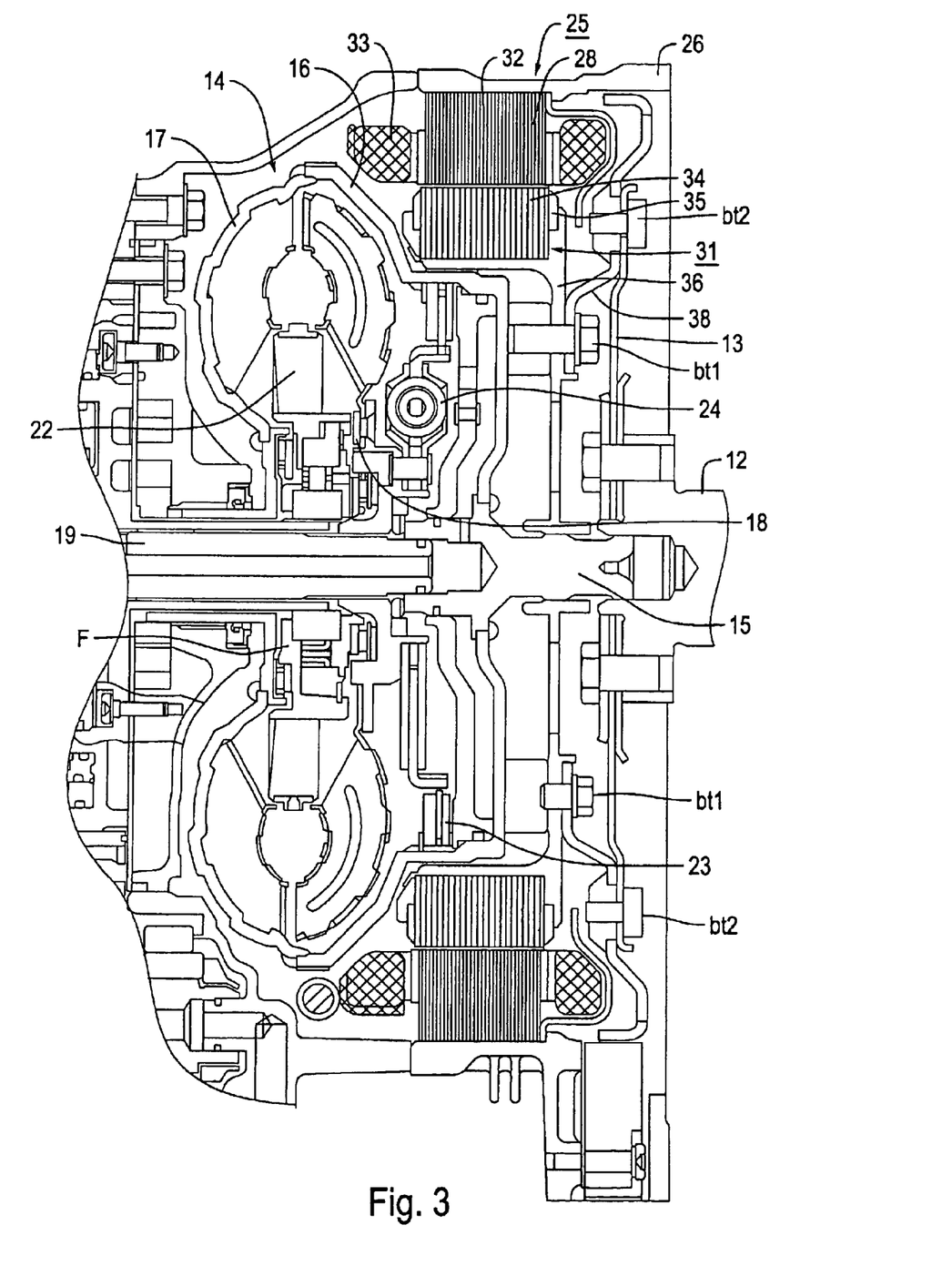
FIG. 3 is a schematic drawing showing a main portion of a vehicle drive device according to the first embodiment of the invention.

Hereafter, embodiments according to the invention will be described with reference to the accompanying drawings. FIG. 3 is a schematic drawing showing a main portion of a vehicle drive device according to a first embodiment of the invention.

In this figure, reference numeral 12 denotes a crank shaft which serves as an output axis directly connected to an engine (not shown); reference numeral 13 denotes a drive plate; reference numeral 14 denotes a torque converter which serves as a hydraulic power transmission device; and reference numeral 25 denotes a motor such as a permanent magnet synchronous motor. The torque converter 14 has a center piece 15, a front cover 16 connected to the center piece 15, a pump impeller 17 connected to the front cover 16, a turbine runner 21 disposed facing the pump impeller 17 to structure a torus with the pump impeller 17 and connected to an input axis 19 of a transmission device via a turbine hub 18, a stator 22, a detachably disposed lock-up clutch device 23, and a damper device 24 for absorbing changes in torque transmitted via the torque converter 14, that is, transmitted torque.

In addition, in the torque converter 14, rotation transmitted from the engine is transmitted to the front cover 16 via the crank shaft 12, the drive plate 13 and a circular plate 38, then transmitted to the pump impeller 17 fixed to the front cover 16. In this case, when the pump impeller 17 rotates, the oil in the torus flows around an axis of the torque converter 14, adding centrifugal force to the oil. Thus, the oil circulates among the pump impeller 17, the turbine runner 21 and the stator 22, thereby rotating the turbine runner 21. The rotation is then transmitted to the input axis 19.

In addition, in cases such as starting of a hybrid-type vehicle where the pump impeller 17 has just started rotating, the rotational speed differential between the pump impeller 17 and the turbine runner 21 is large, and the oil flowing out of the turbine runner 21 flows in a direction that hinders rotation of the pump impeller 17. Therefore, the stator 22 is disposed between the pump impeller 17 and the turbine runner 21. The stator 22 converts the oil flow direction to aid in the rotation of the pump impeller 17 when the rotational speed differential between the pump impeller 17 and the turbine runner 21 is large.

Subsequently, when the rotational speed of the turbine runner 21 becomes high and the rotational speed differential between the pump impeller 17 and the turbine runner 21 becomes small, the oil that was hitting the front side of the blade of the stator 22 starts hitting the back side, thereby hindering the oil flow. Therefore, in order to allow the stator 22 to rotate in only a specific direction, a one-way clutch F is disposed on an inner peripheral side of the stator 22. Thus, when the oil starts hitting the blade back side, the one-way clutch F functions such that the stator 22 rotates naturally, thereby allowing the oil to circulate smoothly. Furthermore, when a preset vehicle speed is reached after the hybrid-type vehicle starts, the lock-up clutch device 23 is engaged. Thus, the engine rotation is directly transmitted to the input axis 19 without going through the oil.

Meanwhile, the motor 25 has a stator 28 fixed to a vehicle drive device case 26, and a rotatably disposed rotor 31 attached to the front cover 16 in an inner radial direction from the starter 28. The stator 28 has a stator core 32, and a coil 33 is wound around the stator core 32. The rotor 31 has a rotor core 34, and permanent magnets (not shown) and projecting poles (not shown) disposed at a plurality of positions on the rotor core 34 in a circumferential direction thereof. Furthermore, the rotor 31 rotates integrally with the crank shaft 12 and the front cover 16.

The rotor 31 is centered around the center piece 15 via a rotor hub 36. The rotor hub 36 is connected to the front cover 16, and connected to the drive plate 13 via the circular plate 38. Note that reference numeral 35 denotes a side plate for clamping the rotor core 34 and the permanent magnet, and bt1 and bt2 denote bolts.

Figure 4:
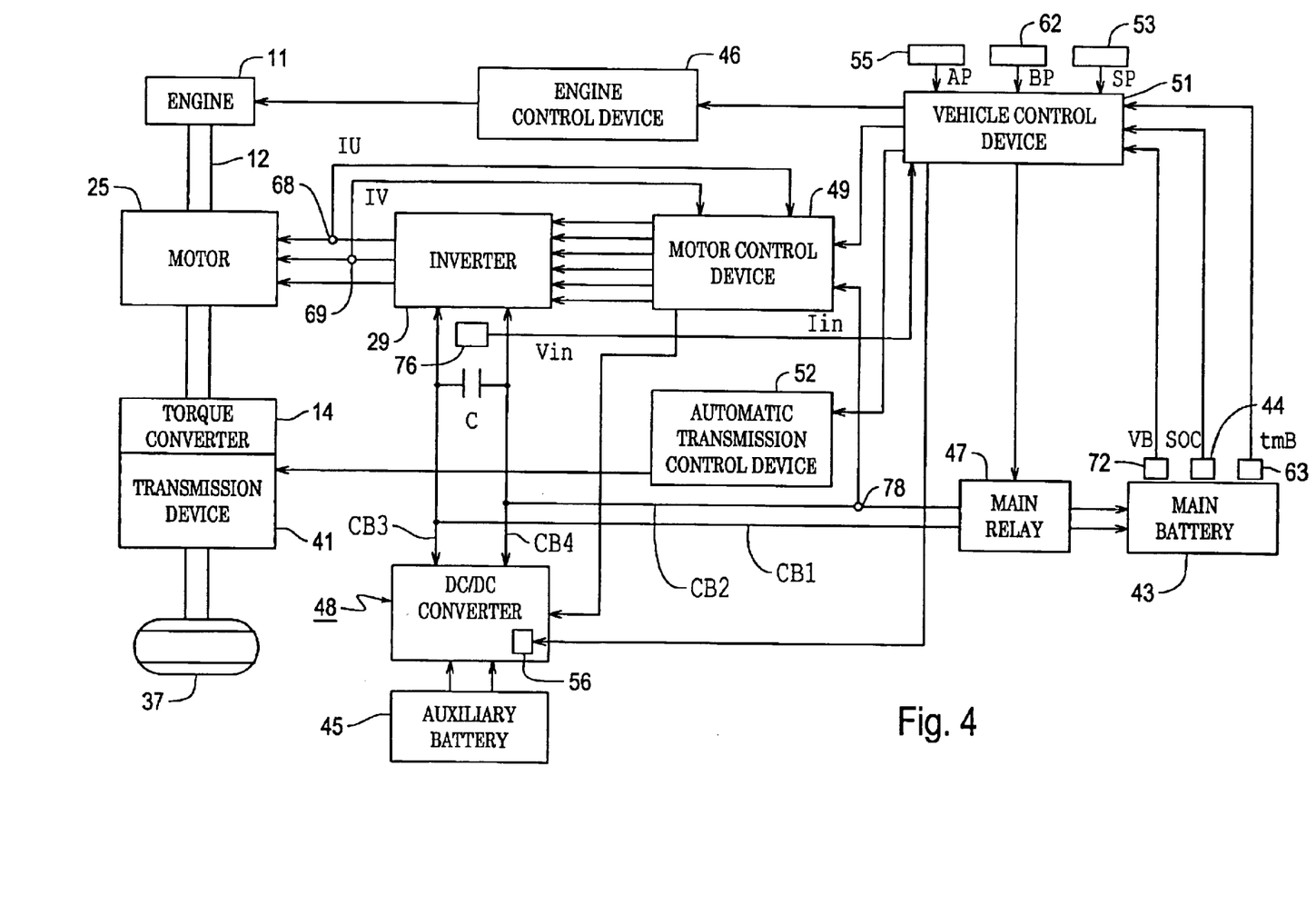
FIG. 4 is a schematic drawing showing a hybrid-type vehicle drive control device according to the first embodiment of the invention.

Next, a hybrid-type vehicle drive control device which serves as an electric vehicle drive control device will be described. FIG. 4 is a schematic drawing showing a hybrid-type vehicle drive control device according to the first embodiment of the invention. In the figure, reference numeral 11 denotes an engine; reference numeral 12 denotes a crank shaft; reference numeral 14 denotes a torque converter; reference numeral 25 denotes a motor; reference numeral 29 denotes an inverter which serves as a motor inverter for driving the motor 25; reference numeral 37 denotes a drive wheel; reference numeral 41 denotes a transmission device connected to the torque converter 14 which changes the rotation output from the torque converter 14 with a predetermined shift pattern; reference numeral 43 denotes a main battery which serves as a first battery used as a power source for running the hybrid-type vehicle; and reference numeral 45 denotes an auxiliary battery which serves as a second battery used as a power source for operating auxiliary machinery in the hybrid-type vehicle. The inverter 29 is connected to the main battery 43 via a main relay 47 which serves as a relay, and DC cables CB1, CB2, thus supplying a DC current from the main battery 43. Furthermore, the main battery 43 is connected to a DC/DC converter 48 via the main relay 47, the DC cables CB1, CB2, and DC cables CB3, CB4 diverging from the direct cables CB1, CB2, thus connecting the DC/DC converter 48 and the auxiliary battery 45.

In the present embodiment, a voltage which serves as a first power source voltage in the main battery 43 is 42V. A voltage which serves as a second power source voltage to the auxiliary battery 45 is 12V. The DC/DC converter 48 converts the 42V voltage into the 12V voltage, and converts the 12V voltage into the 42V voltage. Additionally, a switch 56 is disposed in the DC/DC converter 48. Operation of the DC/DC converter 48 can be started and operation of the DC/DC converter 48 can be stopped by turning on/off the switch 56.

An input side of the inverter 29 is provided with a motor inverter voltage sensor 76 which serves as a DC voltage detecting portion for detecting a DC voltage applied to the inverter 29, that is, a motor inverter voltage Vin.

A motor inverter current sensor 78 which serves as a DC detecting portion for detecting a DC supplied to the inverter 29, that is, a motor inverter current Iin, is disposed at a predetermined portion of the DC cable CB2. Furthermore, the motor inverter voltage Vin is sent to a vehicle control device 51, and the motor inverter current Iin is sent to a motor control device 49. Note that a condenser C for smoothing is connected between the main battery 43 and the inverter 29.

Furthermore, the vehicle control device 51 has a CPU (not shown), a recording device, and the like. The vehicle control device 51 controls the entire vehicle drive device and functions as a computer according to a predetermined program, data, or the like. An engine control device 46, the motor control device 49, and an automatic transmission device control device 52 are connected to the vehicle control device 51. In addition, the engine control device 46 has a CPU (not shown), a recording device, and the like. The engine control device 46 sends command signals for a throttle opening degree θ, a valve timing and the like to the engine 11 in order to control the engine 11. In addition, the motor control device 49 has a CPU (not shown), a recording device, and the like. The motor control device 49 sends drive signals to the inverter 29 in order to control the motor 25. Furthermore, the automatic transmission device control device 52 has a CPU (not shown), a recording device, and the like. The automatic transmission device control device 52 sends all signals such as a solenoid signal, to the transmission device 41 in order to control the automatic transmission device. Note that a first control device is structured from the engine control device 46, the motor control device 49, and the automatic transmission device control device 52, and that a second control device superordinate to the first control device is structured from the vehicle control device 51. Additionally, the engine control device 46, the motor control device 49, and the automatic transmission device control device 52 function as computers, identical to the vehicle control device 51, according to a predetermined program, data, or the like.

The inverter 29 is driven according to drive signals. During powering, upon receiving a direct current from the main battery 43, the inverter 29 generates currents IU, IV, IW of each phase, and supplies each current phase, IU, IV, IW, to the motor 25. During generation, upon receiving the currents IU, IV, IW of each phase from the motor 25, the inverter 29 generates a direct current which is supplied to the main battery 43.

Additionally, reference numeral 44 denotes a remaining amount detecting device for detecting a state of the main battery 43, that is, a remaining amount SOC which serves as the battery state. Reference numeral 53 denotes a shift position sensor for detecting a shift lever position, that is, a shift position SP (not shown) which serves as a shift operating portion. Reference numeral 55 denotes an accelerator switch which serves as an engine load detecting portion and an accelerator operation detecting portion, for detecting an accelerator position (depression amount) (not shown), that is, an accelerator pedal position AP. Reference numeral 62 denotes a brake switch which serves as a brake operation detecting portion for detecting a brake pedal position (depression amount) (not shown), that is, a brake pedal position BP. Reference numeral 63 denotes a battery temperature sensor which serves as a temperature detecting portion for detecting a temperature tmB of the main battery 43. Note that the load on the engine 11, that is, the engine load, is indicated by the accelerator pedal position AP.

Furthermore, reference numerals 68, 69 respectively denote current sensors which serve as AC current detecting portions for detecting the currents IU, IV of each phase. Reference numeral 72 denotes a battery voltage sensor which serves as a voltage detecting portion for the main battery 43 that detects a battery voltage VB which serves as the battery state. The battery voltage VB is sent to the vehicle control device 51. Additionally, a battery current, battery temperature or the like can also be detected as the battery state. Note that a battery state detecting portion is structured from the remaining amount detecting device 44, the battery voltage sensor 72, a battery current sensor (not shown), battery temperature sensor (not shown), and the like. Furthermore, the currents IU, IV are supplied to the motor control device 49.

The vehicle control device 51 sends engine control signals to the engine control device 46 so that the engine control device 46 sets the driving/stopping of the engine 11. Furthermore, a vehicle speed calculation processing mechanism of the vehicle control device 51 (not shown) executes a vehicle calculation process to read out a position of the rotor 31 (FIG. 3) of the motor 25, that is, a rotor position. Then the mechanism calculates a changing rate of the rotor position, and calculates the vehicle speed based on the changing rate and a gear ratio in the torque transfer system from the center piece 15 to the drive wheel 37.

In addition, the vehicle control device 51 sets the rotational speed of an engine 11, that is, a target engine rotational speed NE* which indicates a target value of an engine rotational speed NE, and torque of the motor 25, that is, a target motor torque T* which indicates a target value of a motor torque T. In this embodiment, the motor 25 is used as a starter for starting the engine 11, and as an electric generator herein, it may also be used as an auxiliary drive source for cases where the throttle opening degree θ of the engine 11 is changed and thus an engine torque TE is changed.

Next, operation of the motor control device 49 will be described. In this case, the motor control device 49 executes a feedback control by using a vector control calculation on a d-q axis model where a d axis is plotted in the direction of a pair of magnetic poles of the rotor 31 of the motor 25, and a q axis is plotted in a direction perpendicular to the d axis. First, a motor rotational speed calculation processing mechanism (not shown) of the motor control device 49 executes a motor rotational speed calculation process, reads out the rotor position, and calculates the changing rate of the rotor position in order to calculate the rotational speed of the motor 25, that is, a motor rotational speed N.

Next, a motor control processing mechanism (not shown) of the motor control device 49 executes a motor control process, reads out the target motor torque T* and the battery voltage VB, and refers to a current command value map for controlling the motor recorded in the recording device of the motor control device 49 based on the motor rotational speed N, the target motor torque T* and the battery voltage VB, in order to calculate and determine a d-axis current command value Id* and a q-axis current command value Iq*.

Furthermore, the motor control processing mechanism reads out the currents IU, IV from the current sensors 68, 69, and at the same time, calculates the current IW based on the currents IU, IV as $$IW = IU - IV$$

Note that the current IW can also be detected with a current sensor, identical to that for the currents IU, IV.

Additionally, an AC current calculation processing mechanism (not shown) of the motor control processing mechanism executes an AC current calculation process in order to calculate a d-axis current id and a q-axis current iq, which serve as AC currents. Thus, the AC current calculation processing mechanism executes a three-phase/two-phase conversion in order to convert the currents IU, IV, IW into the d-axis current id and the q-axis current iq. Then, an AC voltage command value calculation processing mechanism of the motor control processing mechanism (not shown) executes an AC voltage command value calculation process in order to calculate voltage command values Vd*, Vq* based on the d-axis current id and the q-axis current iq, as well as the d-axis current command value id* and the q-axis current command value iq*. Furthermore, the motor control processing mechanism executes a two-phase/three-phase conversion in order to convert the voltage command values Vd*, Vq* into voltage command values VU*, VV*, VW*. Then the AC voltage command value calculation processing mechanism calculates pulse width modulation signals SU, SV, SW based on the voltage command values VU*, VV*, VW*, and outputs the pulse width modulation signals SU, SV, SW to a drive processing mechanism (not shown) of the motor control device 49. The drive processing mechanism executes a drive process, and sends drive signals to the inverter 29 based on the processing mechanism that calculates the pulse width modulation signals SU, SV, SW. Thus, the feedback control of the motor 25 is executed.

Figure 1:
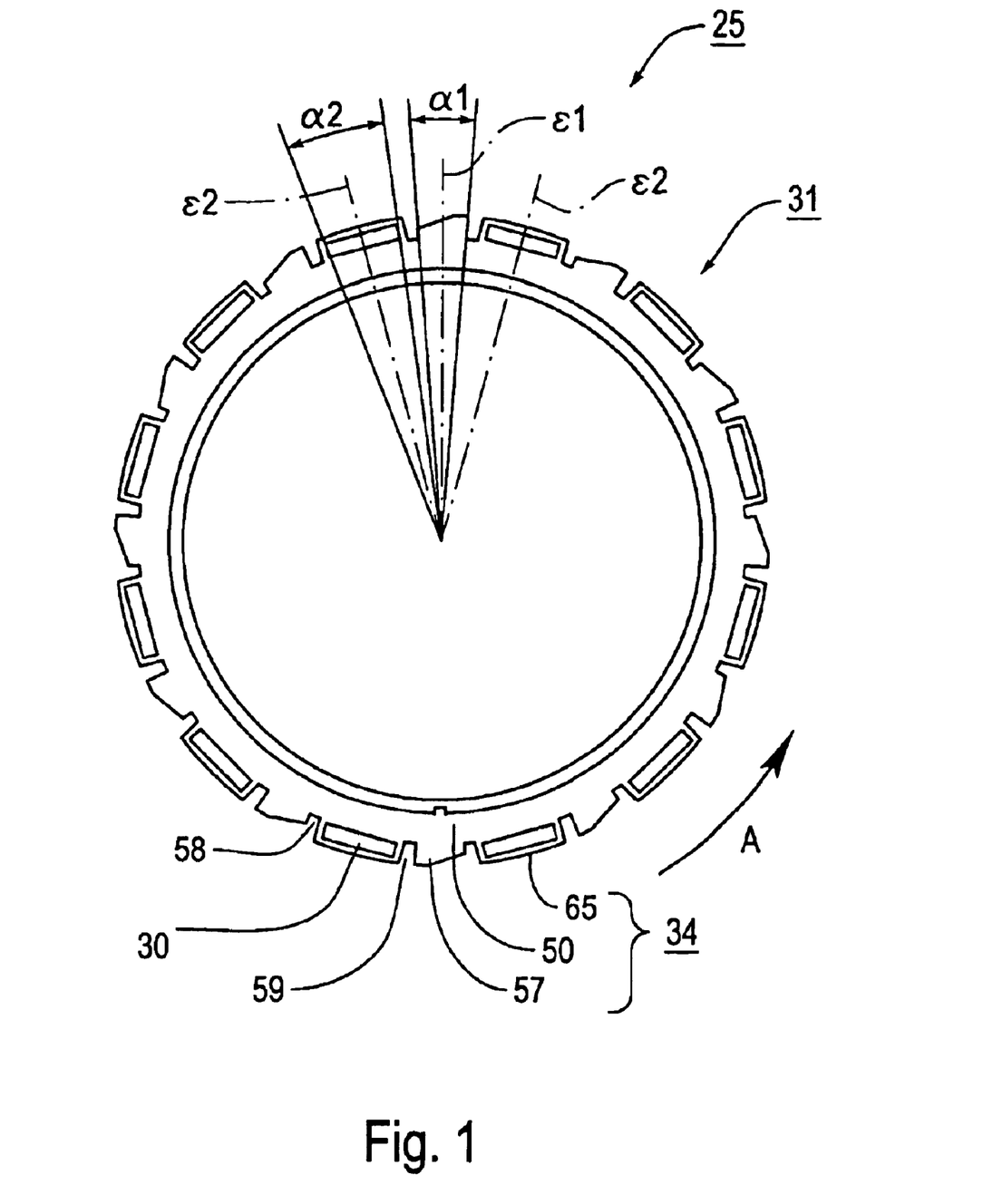
FIG. 1 is a drawing showing an example of a rotor according to a first embodiment of the invention.
Figure 5:
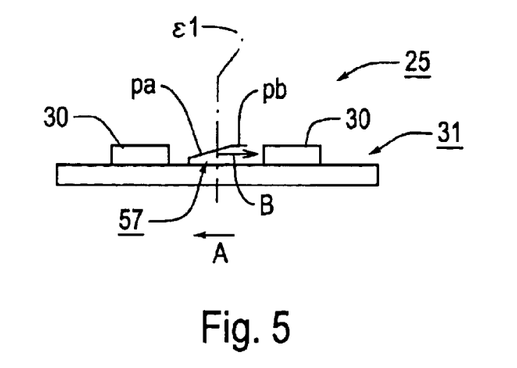
FIG. 5 is a conceptual drawing showing a main portion of the rotor according to the first embodiment of the invention.

Next, the structure of the motor 25 will be described. FIG. 1 is a drawing showing an example of the rotor according to the first embodiment of the invention. FIG. 5 is a conceptual drawing showing a main portion of the rotor according to the first embodiment of the invention.

In these figures, reference numeral 31 denotes a rotor rotative in the direction of an arrow A, in accordance with driving of the motor 25. Reference numeral 34 denotes a rotatably supported rotor core. Reference numeral 30 denotes each permanent magnet disposed at a plurality of positions on the rotor core 34 in the circumferential direction thereof, and in this embodiment, disposed at twelve positions at equal intervals. The rotor core 34 has a circular main body 50 formed by a magnetic body or the like such as steel material; a holding portion 65 which serves as a magnet portion formed by surrounding the permanent magnet 30 in an outward radial direction from the main body 50; and a projecting pole 57 formed at a center between each permanent magnet 30 at equal intervals. Grooves 58, 59 are formed between the permanent magnet 30 and the projecting pole 57. The holding portion 65 holds the permanent magnet 30 against applied centrifugal force when the rotor 31 is rotated.

In the circumferential direction of the rotor 31, an opening angle of the projecting pole 57 is indicated as α1; an opening angle of the permanent magnet 30 as α2; a center line of the opening angle α1 (a line connecting the center of the projecting pole and the axis center of the rotor core 34 (the axis center of the rotor 31) in the rotational direction of the rotor 31) is indicated as ε1; and a center line of the opening angle α2 (a line connecting the center of the permanent magnet 30 and the axis center of the rotor core 34 in the rotational direction of the rotor 31) is indicated as ε2. In this case, the center line ε1 conforms to the center line of an angle created by two center lines ε2.

The stator core 32 (FIG. 3) is disposed on the outer periphery of the rotor core 31. The stator core 32 is provided with seventy-two teeth formed at equal intervals and projecting in an inner axial direction. Slots are formed between each tooth.

The permanent magnet 30, formed on the d axis set by the center line ε1, generates a magnet torque Tm by changing a current phase which indicates the position of an electromagnet formed by supplying current to the coil 33. Furthermore, the projecting pole 57, formed on the q axis set by the center line ε2, generates a reluctance torque Tr by changing the current phase. The q axis is placed at a portion forward from the axis d by a 90° electrical angle.

Meanwhile, the shape of the projecting pole 57 is asymmetrical to the center line ε1. Assuming that the downstream side in the rotational direction of the permanent magnet 30 is the front, and the upstream side is the rear, a tapered portion pa is formed in a predetermined region of the front at an outer periphery of the projecting pole 57, in this embodiment, a first region extending from a front edge of the projecting pole 57 to a position set slightly back from the center line ε1 (mainly a front half portion of the projecting pole 57). A flat portion pb is formed extending along the rotor 31 in the circumferential direction in a second region extending from a rear edge of the first region to a rear edge of the projecting pole 57 (mainly a rear half portion of the projecting pole 57).

Meanwhile, the permanent magnet 30 is equivalent to an air gap with respect to passability of magnetic flux. On the other hand, the projecting pole 57 is formed of a magnetic body such as steel material, and is formed integrally with the main body 50. Thus, the projecting pole 57 reduces the air gap by an amount of the projection toward the stator core 32, that is, the amount of the projection in the outer radial direction.

Therefore, by forming the tapered portion pa in the first region, the air gap between the stator 22 and the rotor 31 is increased on the downstream side of the center of the projecting pole 57 with respect to the rotational direction of the rotor core 34.

Furthermore, from the standpoint of the entire projecting pole 57, the center in the density distribution of magnetic flux which is generated in the projecting pole 57 by magnetomotive force caused by running the q-axis current iq through the coil is shifted (offset) in a direction opposite the rotational direction (the arrow A direction) of the rotor 31, that is, in an arrow B direction.

For the reluctance torque Tr, this is equivalent to an offset of the q-axis in the arrow B direction. Therefore, the reluctance torque Tr can be generated even when the current phase is 0°. Therefore, the current phase when the reluctance torque Tr is at its maximum value approaches between 0° and 45°. Note that in this embodiment, the motor 25 is connected to the engine 11 via the crank shaft 12, thus the motor 25 is only driven in one direction and the rotor 31 is rotated only in the arrow A direction.

In this embodiment, the tapered portion pa is formed in the first region, thus when the rotor 31 is rotated, a change in the magnetic flux flow at the time when the respective teeth and corresponding projecting poles are switched can be reduced. Thus, pulsation can be prevented from occurring. As a result, vibrations can be prevented from occurring when the motor 25 is driven. Note that the first region may be deformed in a predetermined pattern instead of the tapered portion pa, according to the characteristics of the motor 25.

Figure 6:
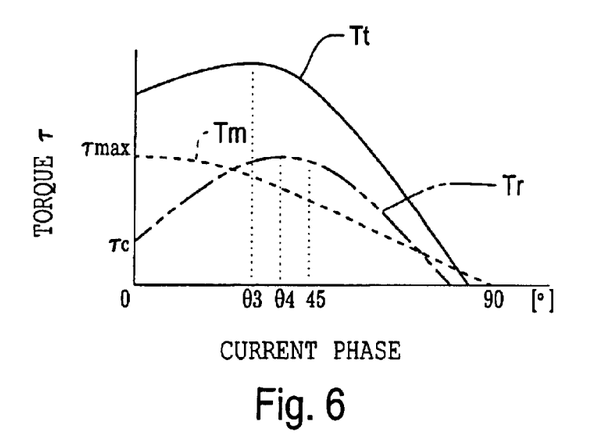
FIG. 6 is a relation drawing of a current phase and a torque according to the first embodiment of the invention.

FIG. 6 is a relation drawing of the current phase and torque according to the first embodiment of the invention. Note that the current phase is plotted on the horizontal axis and the torque on the vertical axis in the figure.

In the figure, Tm denotes the magnet torque. The number of pairs of magnetic poles is indicated as P. The magnetic flux of the permanent magnet 30 interlinked with the coil is indicated as $\phi m$. The magnet torque Tm is $$Tm = P \cdot \phi m \cdot iq$$

If the current supplied to the coil 33 (FIG. 3) is indicated as I (IU, IV, IW), the q-axis current iq is $$iq = \sqrt{(3)} \cdot I \cdot \cos \theta$$

Therefore, the magnet torque Tm is $$Tm = P \cdot \phi m \cdot \sqrt{(3)} \cdot I \cdot \cos \theta$$

Meanwhile, if Tr denotes the reluctance torque, the d-axis inductance is indicated as Ld, the q-axis inductance as Lq, and the d-axis current as id, the reluctance torque Tr is $$Tr = P \cdot (Ld - Lq) \cdot id \cdot iq$$

Here, the d-axis current id is $$id = \sqrt{(3)} \cdot I \cdot \sin \theta$$

Therefore, when the angle (electrical angle) by which the magnetic flux center is shifted in the arrow B direction is indicated as $\beta$, the reluctance torque Tr is $$Tr = P \cdot (Ld - Lq) \cdot 3 \cdot I^2 \cdot 2 \cdot \sin(2\theta + \beta)$$
$$= 6 \cdot P \cdot (Ld - Lq) \cdot I^2 \cdot \sin(2\theta + \beta)$$

Furthermore, Tt indicates the total torque obtained as a sum of the magnet torque Tm and the reluctance torque Tr. The total torque Tt is $$Tt = P \cdot \phi m \cdot \sqrt{(3)} \cdot I \cdot \cos \theta + 6 \cdot P \cdot (Ld - Lq) \cdot I^2 \cdot \sin(2\theta + \beta)$$

In this case, when the current phase is 0°, the magnet torque Tm is a maximum value $\tau$max, and the reluctance torque Tr is a predetermined value $\tau$c larger than zero (0). Therefore, the current phase when the reluctance torque Tr is the maximum value approaches between 0° and 45°, becoming $\theta$°.

Additionally, the maximum value of the total torque Tt is obtained when the current phase is at a value $\theta 3$ (30°, for example) between 0 and $\theta$ 4°, where the magnet torque Tm is a value near the maximum value $\tau$max. Accordingly, the magnet torque Tm can be sufficiently utilized, therefore the motor 25 can be downsized when the total torque Tt of a required value is generated.

Note that the total torque Tt in the case where the tapered portion pa (FIG. 5) is not formed is $$Tt = P \cdot \phi m \cdot \sqrt{(3)} \cdot I \cdot \cos \theta + 6 \cdot P \cdot (Ld - Lq) \cdot I^2 \cdot \sin 2\theta$$

Meanwhile, the motor 25 driven in a high rotation region becomes a greater angular speed $\omega$, thus the value $\omega$Lq indicating a product of the q-axis inductance Lq and the angular speed $\omega$ becomes greater by that amount. Therefore, the output of the motor 25 cannot be increased. For this reason, the motor 25 is designed such that, in the case where the motor 25 is driven in a high rotation region, the current phase is only advanced by a predetermined amount and a magnetic field weakening control is executed.

However, in this embodiment, the center in the density distribution of magnetic flux which is generated in the projecting pole 57 by magnetromotive force caused by running the q-axis current iq through the coil is shifted in the arrow B direction opposite the rotational direction (the arrow A direction) of the rotor 31. Therefore, the q-axis inductance Lq for the powering side is smaller by that amount with respect to the normal shape of the projecting pole 57. Accordingly, the amount by which the current phase is advanced when the magnetic field weakening control is executed can be decreased by that much. As a result, the total torque Tt can be prevented from being decreased, thereby enabling an increase in the output generated by the motor 25.

Next, the voltage V (VU, VV, VW) will be described. The voltage V (VU, VV, VW) is applied to the coil 33 when the motor 25 is driven in a low rotation region where the angular speed $\omega$ is low, and when the motor 25 is driven in a high rotation region where the angular speed $\omega$ is high.

Figure 7:
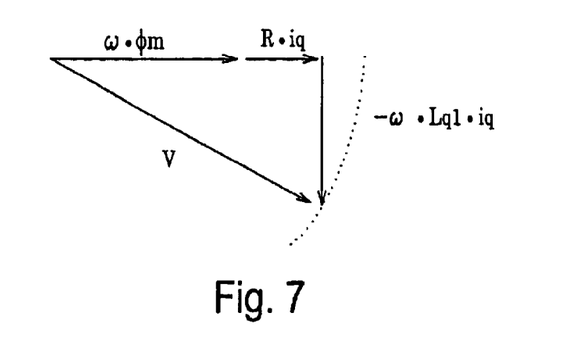
FIG. 7 is a comparative diagram showing a drive state of a motor driven without offset in a low rotation region.
Figure 8:
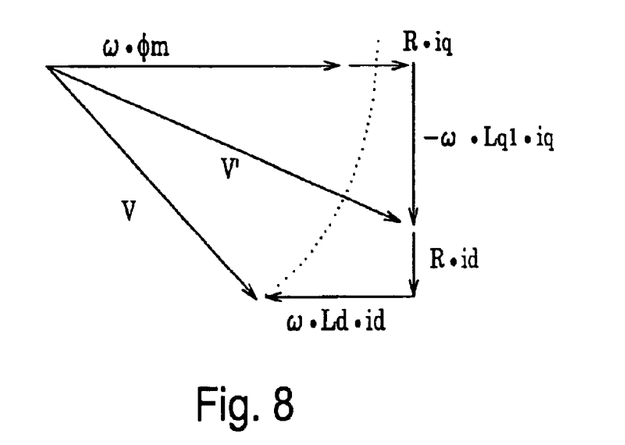
FIG. 8 is a comparative diagram showing the drive state of the motor driven without offset in a high rotation region.
Figure 9:
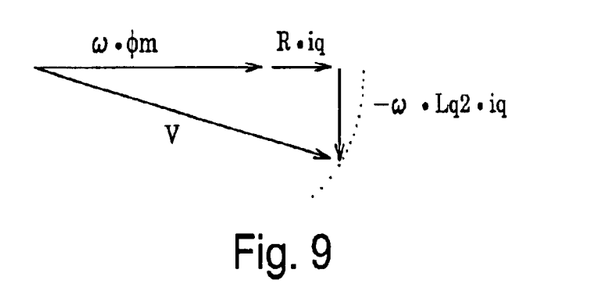
FIG. 9 is a drawing showing the drive state of the motor driven in the low rotation region according to the first embodiment of the invention.
Figure 10:
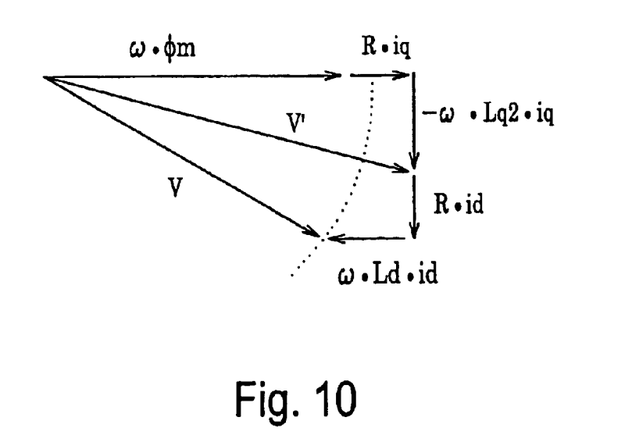
FIG. 10 is a drawing showing the drive state of the motor driven in the high rotation region according to the first embodiment of the invention.

FIG. 7 is a comparative diagram showing the drive state of the motor driven in a low rotation region where offset is not executed. FIG. 8 is a comparative diagram showing the drive state of the motor driven in high rotation region where offset is not executed. FIG. 9 is a diagram showing the drive state of the motor driven in a low rotation region according to the first embodiment of the invention. FIG. 10 is a diagram showing the drive state of the motor driven in a high rotation region according to the first embodiment of the invention.

Meanwhile, if a q-axis voltage on the d-q axis model is indicated as Vq, and a d-axis voltage as Vd, the voltage V is $$V = \sqrt{(Vq^2 + Vd^2)}$$

If the angular speed of the rotor 31 (FIG. 3) is indicated as $\omega$, the resistance of the stator 28 as R, and the magnetic flux of the permanent magnet 30 which interlinks with the coil as $\phi m$, the q-axis voltage Vq is calculated based on the voltage formula as $$Vq = w\phi m + R \cdot iq$$

Furthermore, if the q-axis inductance Lq without offset is indicated as Lq1, the d-axis voltage Vd based on the voltage formula is $$Vd = -w \cdot Lq1 \cdot iq$$

In addition, similar to a conventional motor, the voltage V falls below an upper limit value shown as a dotted line in FIG. 7, when the motor 25 is driven in the low rotation region without offset.

Furthermore, when the motor 25 is driven without offset in the high rotation region, the q-axis voltage Vq increases in accordance with the increase in the angular speed ω. As shown in FIG. 8, a theoretically required voltage V' exceeds the upper limit value region, thereby generating voltage saturation. For this reason, the magnetic field weakening control is executed, and a negative d-axis current id is supplied. The d-axis voltage Vd is $$Vd=-w\cdot Lq1\cdot iq+R\cdot id$$

Further, the q-axis voltage Vq is $$Vq=w\cdot\phi m+R\cdot iq+w\cdot L d\cdot id$$

As described above, as shown in FIG. 8, the voltage V falls below the upper limit value shown as the dotted line.

On the other hand, in this embodiment, if the q-axis inductance Lq with offset is indicated as Lq2, then $$Lq2<Lq1$$

Therefore, $$Vd=-w\cdot Lq2\cdot iq+R\cdot id$$

Furthermore, the q-axis voltage Vq is indicated as $$Vq=w\cdot\phi m+R\cdot iq+w\cdot L d\cdot id$$

Therefore, when the motor 25 is driven in the low rotation region, the voltage V falls below the upper limit value as shown in FIG. 9.

In addition, when the motor 25 is driven in the high rotation region even with an offset, the q-axis voltage Vq increases in accordance with the increase in the angular speed ω. As shown in FIG. 10, the theoretically required voltage V' exceeds the upper limit value region. For this reason, the magnetic field weakening control is executed, and a negative d-axis current id is supplied. The d-axis voltage Vd is $$Vd=-w\cdot Lq2\cdot iq+R\cdot id$$

Further, the q-axis voltage Vq is $$Vq=w\cdot\phi m+R\cdot iq+w\cdot L d\cdot id$$

However, in this embodiment, a value Lq2 of the q-axis inductance Lq value with offset is smaller than the value Lq1. Thus the voltage V' in FIG. 10 is small compared to the voltage V' in FIG. 8. Accordingly, the motor rotational speed N for starting the magnetic field weakening control can be increased. Additionally, the d-axis current id supplied for the magnetic field weakening control can be reduced.

As a result, the total torque Tt can be prevented from decreasing when the motor is driven at high speed. Thus, the output generated by the motor can be increased.

Next, a voltage applied to the coil 33 during powering where the motor 25 is driven to generate the motor torque T is indicated as a powering motor voltage Vmot. A voltage applied to the coil 33 during regenerating where the motor torque T in the opposite direction is output by the motor 25 is indicated as a regenerating motor voltage Vgen. Hereinafter, characteristics of the powering motor voltage Vmot and the regenerating motor voltage Vgen will be described.

Figure 11:
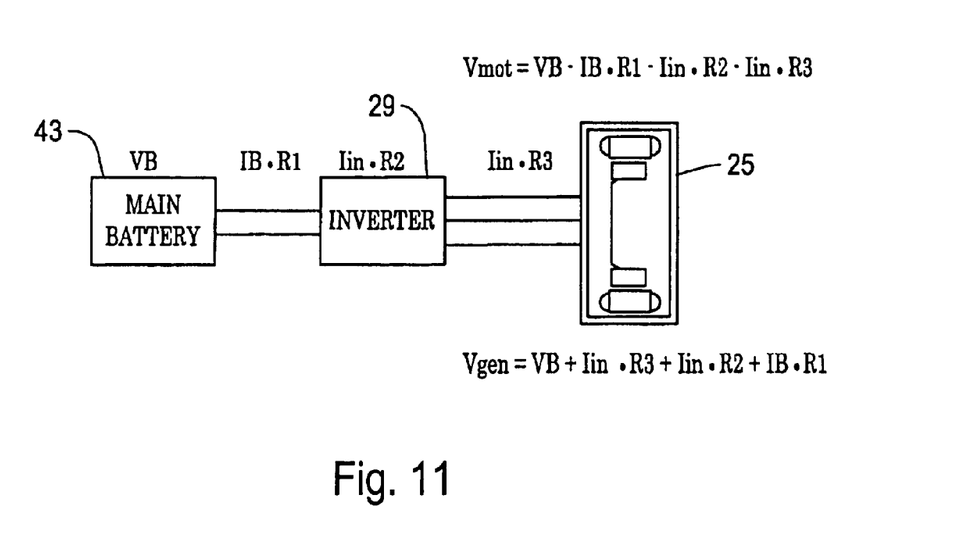
FIG. 11 is a conceptual drawing showing the motor drive device according to the first embodiment of the invention.
Figure 12:
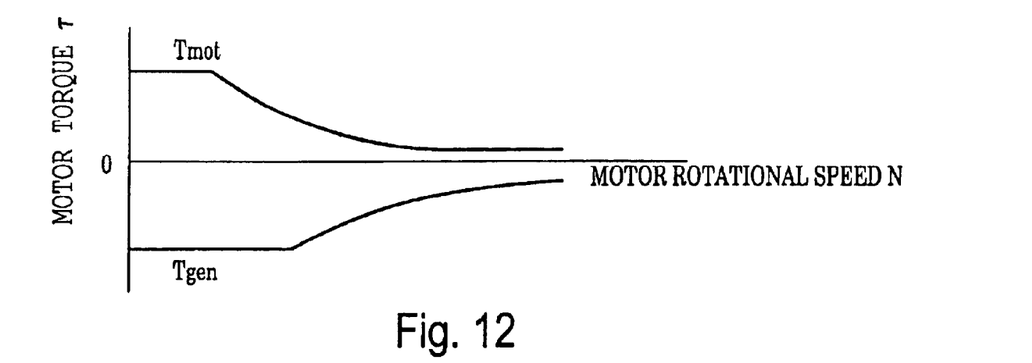
FIG. 12 is a characteristics drawing showing a powering motor voltage and a regenerating motor voltage without offset.
Figure 13:
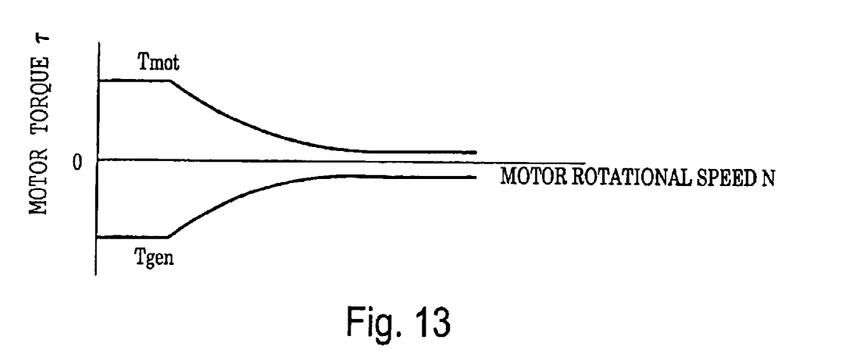
FIG. 13 is a characteristics drawing showing the powering motor voltage and the regenerating motor voltage according to the first embodiment of the invention.

FIG. 11 is a conceptual drawing showing a motor drive device according to the first embodiment of the invention. FIG. 12 is a characteristics drawing showing the powering motor voltage and the regenerating motor voltage, without offset. FIG. 13 is a characteristics drawing showing the powering motor voltage and the regenerating motor voltage according to the first embodiment of the invention. Note that, in FIGS. 12 and 13, the motor rotational speed N is plotted on the horizontal axis, and the motor torque T on the vertical axis.

In FIG. 11, reference numeral 25 denotes the motor; reference numeral 29 denotes the inverter; and reference numeral 43 denotes the main battery. Here, the battery voltage is indicated as VB; the battery current as IB; the internal resistance of the main battery 43 as R1; the motor inverter current as Iin; the switching resistance of the inverter 29 as R2; and the resistance of the DC cables CB1, CB2 (FIG. 4) as R3. The powering motor voltage Vmot is indicated as $$Vmot=VB-IB\cdot R1-Iin\cdot R2-Iin\cdot R3$$

In addition, the regenerating motor voltage Vgen is indicated as $$Vgen=VB+Iin\cdot R3+Iin\cdot R2+IB\cdot R1$$

In a case where the battery voltage VB during powering and during regenerating are equal, if there is no offset as in a conventional motor, the same motor rotational speed N generates a regenerating motor torque Tgen larger than the powering motor torque Tmot at a time of high rotation, as shown in FIG. 12. Additionally in this embodiment where there is offset, the q-axis inductance Lq during powering is smaller than in a conventional motor; the amount by which the current phase is advanced when the magnetic field weakening control is executed can be made smaller; and a control can be executed in a current phase where a torque constant (=torque/current) is high. Thus, the motor torque Tmot during high rotation is increased. On the other hand, during regenerating, the motor torque Tgen is decreased by that amount because the q-axis inductance Lq is greater than that in a conventional case. As a result, as shown in FIG. 13, the regenerating motor torque Tgen and the powering motor torque Tmot can be made equal. Therefore, the output of the motor 25 during powering and regenerating can be equalized.

In this embodiment, the tapered portion pa is formed in the first region of each projecting pole 57. However, the dimension in the axial direction of the first region of each projecting pole 57 can be made smaller than the dimension in the axial direction of the second region.

Furthermore, the dimension in the axial direction of the first region of each projecting pole 57 can be gradually changed so as to be smaller farther along a downstream side thereof with respect to the circumferential direction of the rotor 31.

Figure 14:
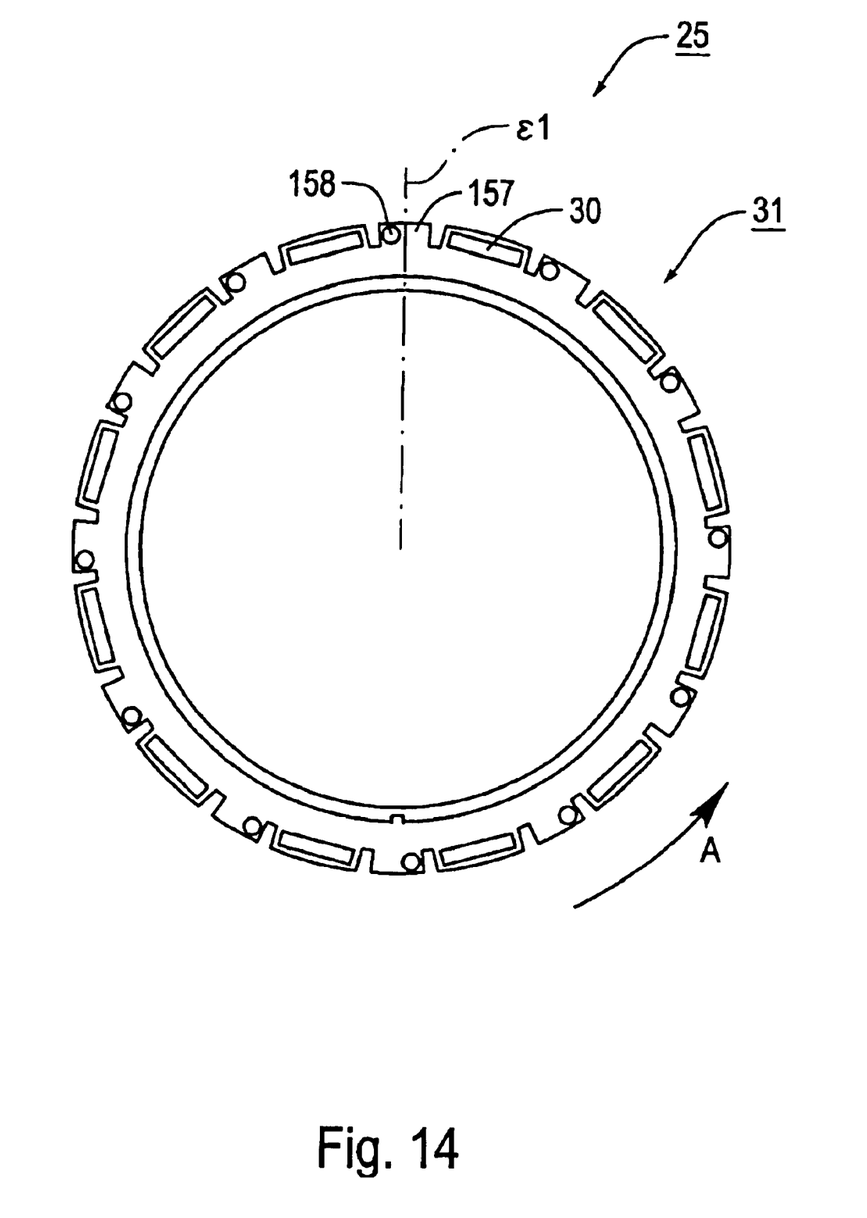
FIG. 14 is a drawing showing an example of a rotor according to a second embodiment of the invention.

Hereinafter, a second embodiment of the invention will be described. FIG. 14 is a drawing showing an example of a rotor according to the second embodiment of the invention. In the figure, reference numeral 25 denotes the motor, reference numeral 31 denotes the rotor, reference numeral 30 denotes the permanent magnet, and reference numeral 157 denotes the projecting pole. In this case, the projecting pole 157 is shaped asymmetrical to the center line є1. A hole portion 158 extending in the axial direction is formed in a predetermined region in front of the projecting pole 157, and particularly in this embodiment, in the first region in the front half portion of the projecting pole 157. Although the hole portion 158 has a circular shape, it may have any other shape.

The hole portion 158 is equivalent to an air gap with respect to passability of magnetic flux. Thus, the appearance of the air gap with respect to the outward radial direction of the hole portion 158 appears larger from the standpoint of the entire projecting pole 157. The center in the density distribution of magnetic flux which is generated in the projecting pole 157 by magnetromotive force caused by running the q-axis current iq through the coil is shifted in the arrow B direction (FIG. 5) opposite the rotational direction (the arrow A direction) of the rotor 31.

Note that the invention is not limited to the embodiments mentioned above, and various modifications based on the purpose of the invention are possible, which are not excluded from the scope of the invention.

What is claimed is:

1. A motor, comprising:

a rotatably supported rotor core; and permanent magnets disposed at equal intervals at a plurality of positions in a circumferential direction of the rotor core, wherein the rotor core is provided with projecting poles formed at equal intervals at a center between each permanent magnet, an opening angle center line of each projecting pole conforms to a center line of an angle created by each opening angle center line of two adjacent permanent magnets, and each projecting pole is shaped asymmetrical to a line connecting a center of the projecting pole in a rotational direction of the rotor core and an axis center of the rotor core.

2. The motor of claim 1, wherein the opening angle center line of the projecting poles is the same as the line connecting the center of the projecting pole in the rotational direction of the rotor core and the axis center of the rotor core.

3. The motor of claim 1, wherein a tapered portion is formed from a front edge of the projecting pole in the rotational direction of the rotor core to a position set slightly back from the opening angle center line of the projecting pole.

4. The motor of claim 3, wherein a flat portion is formed from an end of the tapered portion to a rear edge of the projection pole in the rotational direction of the rotor core.

5. The motor of claim 1, wherein grooves are formed between the permanent magnets and the projecting poles.

6. A motor, comprising:

a rotatably supported rotor core; and permanent magnets disposed at equal intervals at a plurality of positions in a circumferential direction of the rotor core, wherein the rotor core is provided with projecting poles formed at equal intervals at a center between each permanent magnet, an opening angle center line of each projecting pole conforms to a center line of an angle created by each opening angle center line of two adjacent permanent magnets, and an air gap on a side downstream from a center of the projecting pole in a rotational direction of the rotor core is larger than an air gap on an upstream side with respect to each projecting pole.

7. The motor of claim 6, wherein a tapered portion is formed from a front edge of the projecting pole in the rotational direction of the rotor core to a position set slightly back from the opening angle center line of the projecting pole.

8. The motor of claim 7, wherein a flat portion is formed from an end of the tapered portion to a rear edge of the projection pole in the rotational direction of the rotor core.

9. The motor of claim 6, wherein grooves are formed between the permanent magnets and the projecting poles.

10. A motor, comprising:

a rotatably supported rotor core; and permanent magnets disposed at equal intervals at a plurality of positions in a circumferential direction of the rotor core, wherein the rotor core is provided with projecting poles formed at equal intervals at a center between each permanent magnet, an opening angle center line of each projecting pole conforms to a center line of an angle created by each opening angle center line of two adjacent permanent magnets, and a tapered portion is formed on a front half portion of each projecting pole.

11. The motor of claim 10, wherein the tapered portion is formed from a front edge of the projecting pole in a rotational direction of the rotor core to a position set slightly back from the opening angle center line of the projecting pole.

12. The motor of claim 11, wherein a flat portion is formed from an end of the tapered portion to a rear edge of the projection pole in the rotational direction of the rotor core.

13. The motor of claim 10, wherein grooves are formed between the permanent magnets and the projecting poles.

* * * * *